(12) United States Patent
Tanaka et al.

(10) Patent No.: US 6,866,421 B2
(45) Date of Patent: Mar. 15, 2005

(54) PLAIN BEARING AND PROCESS FOR PRODUCING THE SAME

(75) Inventors: Takuya Tanaka, Inuyama (JP); Hideyuki Nakajima, Inuyama (JP); Nobutaka Hiramatsu, Inuyama (JP); Masahito Fujita, Inuyama (JP); Takayuki Shibayama, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 128 days.

(21) Appl. No.: 10/351,626

(22) Filed: Jan. 27, 2003

(65) Prior Publication Data

US 2003/0185474 A1 Oct. 2, 2003

(30) Foreign Application Priority Data

Mar. 26, 2002 (JP) ........................................ 2002-084890

(51) Int. Cl.$^7$ ............................ F16C 33/20; F16C 43/02
(52) U.S. Cl. ........................ 384/300; 384/276; 384/908; 29/898.055
(58) Field of Search ................................ 384/276, 300, 384/908, 909, 297; 29/898.055, 898.059

(56) References Cited

U.S. PATENT DOCUMENTS

| 3,594,049 A | * | 7/1971 | Turner .................... 384/300 |
| 3,950,047 A | * | 4/1976 | Capelli ................... 384/298 |
| 5,525,246 A | | 6/1996 | Kamiya et al. |

FOREIGN PATENT DOCUMENTS

| GB | 2238492 | 6/1991 |
| GB | 2337306 | 11/1999 |
| GB | 2360294 | 9/2001 |
| JP | 2089813 | 3/1990 |
| JP | 2000136397 | 5/2000 |

* cited by examiner

Primary Examiner—Thomas R. Hannon
(74) Attorney, Agent, or Firm—Browdy and Neimark, P.L.L.C.

(57) ABSTRACT

A plain bearing comprising a backing alloy made of copper alloy or aluminum alloy, a coat layer of synthetic resin formed on the surface of a backing alloy, and a thin film of polytetrafluoroethylene formed on the surface of the coat layer has a lower coefficient friction, improved conformability and distinguished sliding characteristics.

4 Claims, 1 Drawing Sheet

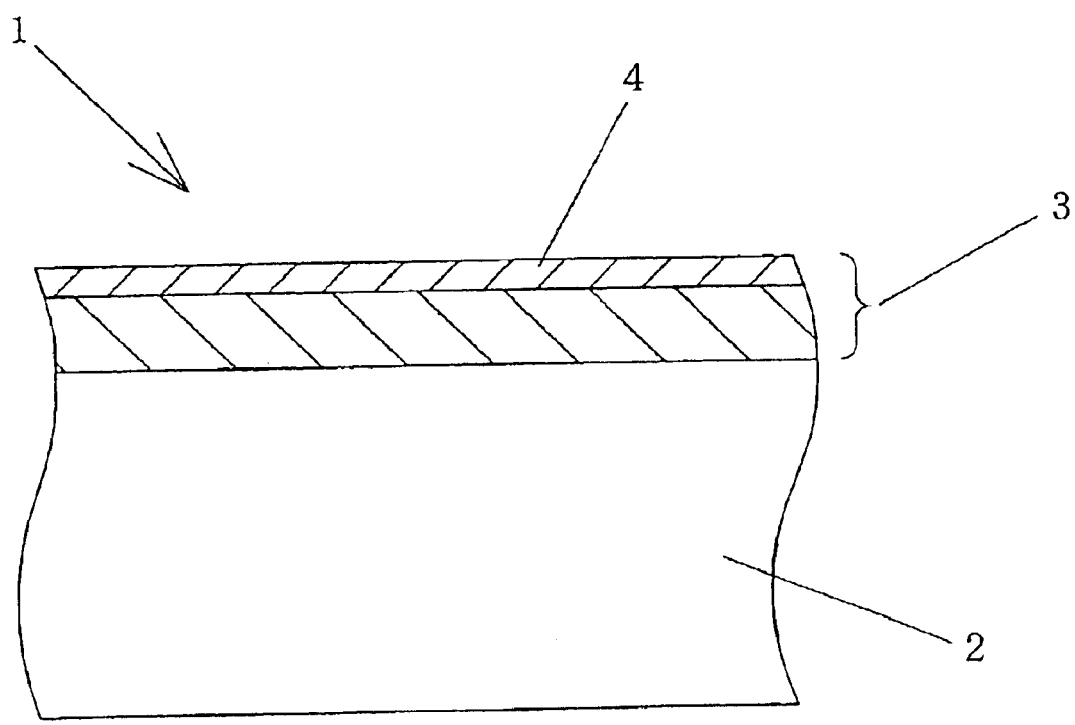

PLAIN BEARING AND PROCESS FOR PRODUCING THE SAME

BACKGROUND OF THE INVENTION

The present invention relates to a plain bearing, which comprises a backing alloy made of copper alloy or aluminum alloy and a coat layer of synthetic resin formed on the surface of the backing alloy, and to a process for producing the same.

Generally, plain bearings for use in internal combustion engines, etc. are often exposed to severe use conditions such as high speed revolution, heavy load, etc. So far proposed plain bearings capable of meeting use in such severe conditions include, for example, a plain bearing comprising a backing alloy made of copper alloy, aluminum alloy, or the like and a coat layer formed on the surface of the backing alloy, as disclosed in JP-A-2000-136397. Such a plain bearing has an improved sliding property, because the coat layer is formed from polyimide or polyamideimide as a base resin, which further contains polytetrafluoroethylene and graphite as solid lubricants.

However, requirements for further improvement of the sliding property of plain bearings have been recently imposed to meet higher power output, higher performance, etc. of plain bearings for use in internal combustion engines, etc., but the aforementioned conventional plain bearings have found unsatisfactory for attaining the required performances, particularly reduction in the coefficient of friction, improvement of conformability and anti-seizure characteristics, etc.

BRIEF SUMMARY OF THE INVENTION

The present invention has been made to meet the aforementioned requirements and an object of the present invention is to provide a plain bearing with a distinguished sliding property attained by forming a thin film of polytetrafluoroethylene on the surface of a coat layer and a process for producing the same.

The present invention provides a plain bearing, which comprises a backing alloy made of copper alloy or aluminum alloy, a coat layer of synthetic resin formed on the surface of the backing alloy, and a thin film of polytetrafluoroethylene formed on the surface of the coat layer.

The present invention further provides a process for producing a plain bearing, which comprises at least a step of roughening a synthetic resin-to-be-coated surfaces of a backing alloy, a step of cleaning and activating the roughened synthetic resin-to-be-coated surface, a step of coating the roughened synthetic resin-to-be-coated surface with a synthetic resin, and a step of curing the coated synthetic resin at a temperature of not lower than the melting point of polytetrafluoroethylene, thereby forming a coat layer.

BRIEF DESCRIPTION OF THE DRAWING

The accompanying drawing is a cross-sectional view of a plain bearing according to the present invention.

DETAILED DESCRIPTION OF THE INVENTION

To attain the aforementioned object of the present invention, the present invention provides a plain bearing, which comprises a backing alloy made of copper alloy or aluminum alloy, a coat layer of synthetic resin formed on the surface of the backing alloy, and a thin film of polytetrafluoroethylene formed on the surface of the coat layer.

In the above plain bearing structure, a counter member can slide over the thin film of polytetrafluoroethylene formed on the surface of the coat layer, so that the coefficient of friction can be reduced and the counter member can smoothly slide over the thin film even at the initial stage of sliding. Furthermore, the conformability of the coat layer can be improved thereby, and thus, for example the counter member, even if in an abutting position, is never worn away. Still furthermore, the anti-seizure characteristics of the coat layer can be improved thereby, so that the plain bearing can be used even in a high load condition.

In the present invention, the coat layer of synthetic resin comprises 95–30% by volume of a thermoplastic resin or polybenzoimidazole and 5–70% by volume of a solid lubricant, where at least 5–50% by volume of the solid lubricant is polytetrafluoroethylene. In the above coat layer structure, the solid lubricant contained in the coat layer can improve the wear resistance and friction property of the plain bearing, and the polytetrafluoroethylene contained therein can form a thin film on the surface of the coat layer, thereby reducing the coefficient of friction of the plain bearing and improving the conformability and anti-seizure characteristics.

The present plain bearing can be produced by a process, which comprises at least a step of roughening a synthetic resin-to-be-coated surface of a backing alloy, a step of cleaning and activating the roughened synthetic resin-to-be-coated surface, a step of coating the roughened synthetic resin-to-be-coated surface with a synthetic resin, and a step of curing the coated synthetic resin at a temperature of not lower than the melting point of polytetrafluoroethylene thereby forming a coat layer. In the above process, a thin film of polytetrafluoroethylene can be formed on the surface of the coat layer, and thus a plain bearing with a reduced coefficient of friction and improved conformability and anti-seizure characteristics can be produced thereby.

Embodiments of the present invention will be described in detail below, referring to the accompanying drawing showing a cross-sectional view of plain bearing 1 according to one embodiment of the present invention.

In the FIGURE, plain bearing 1 is in a structure comprising backing alloy 2 made of copper alloy or aluminum alloy, a coat layer 3 formed on the surface of backing alloy 2, and a thin film 4 of polytetrafluoroethylene (which will be hereinafter referred to as PTFE), formed on the surface of coat layer 3.

Coat layer 3 comprises a synthetic resin and a solid lubricant. As the synthetic resin, any one of the following resins can be used in coat layer 3, for example, thermosetting resins such as polyamideimide resins (which will be hereinafter referred to as PAI), epoxy resins (which will be hereinafter referred to as EP), phenol resins and polyimide resins, and thermoplastic resins such as polybenzoimidazole (which will be hereinafter referred to as PBI).

As the solid lubricant, the following materials can be used in coat layer 3, for example, PTFE, graphite (which will be hereinafter referred to as Gr), molybdenum disulfide (which will be hereinafter referred to as $MoS_2$) and boron nitride (which will be hereinafter referred to as BN). It is preferable that as least 5–50% by volume of the solid lubricant is PTFE. The solid lubricant is added in a proportion of 5–70% by volume on the basis of sum total of the synthetic resin and the solid lubricant to improve the wear resistance and friction property. Below 5% by volume, the effect on the improvement of wear resistance and friction property tends to decrease, whereas above 70% by volume, the strength of the synthetic resin tends to decrease.

A process for producing a plain bearing 1 with a coat layer 3 in the above structure will be described below:

At first, backing alloy 2 is subjected to a degreasing treatment and then the synthetic resin-to-be-coated surface of backing alloy 2 is roughened by sand blasting, mechanical processing or the like. Thereafter, the roughened synthetic resin-to-be-coated surface is made into a clean, activated surface by ultrasonic cleaning, pickling, water washing, electric discharge treating, or the like. Then, the backing alloy 2 is preheated to 40°–120° C. Thereafter, a coating liquid comprising a PTFE-containing solid lubricant as dispersed in a synthetic resin binder is applied to the synthetic resin-to-be-coated surface of the preheated backing alloy 2 by spraying, printing, roll coating, or the like. In the case of application by printing, it is not necessary to preheat the backing alloy 2.

When the coated coating liquid is cured at a temperature of not lower than the melting point of PTFE, preferably about 350° C., the synthetic resin can be cured, while PTFE is released from the coat layer 3 to the surface to form a thin film 4 of PTFE on the surface of the coat layer 3, because the curing temperature, i.e. 350° C. is higher than the melting temperature of PTFE, i.e. 327° C., thereby releasing PTFE from the coat layer 3 to the surface. That is, the curing temperature must be not lower than the melting point of PTFE, but at too higher a curing temperature the synthetic resin will be decomposed. Thus, a curing temperature incapable of decomposing the synthetic resin must be selected as an upper limit temperature. Curing time depends on the curing temperature, and when the curing temperature is 350° C., a curing time of about one hour is satisfactory.

The present invention will be described in detail below, referring to Examples.

EXAMPLES 1 to 13 AND COMPARATIVE EXAMPLES 1 to 5

A plurality of test pieces made by the above-mentioned process were used to determine the coefficient of friction, wear amount, and seizure load, while changing the composition of coat layer 3 and the curing temperature. Table 1 shows conditions for thrust type tests for determining the coefficient of friction, wear amount and seizure load of coat layer 3, and Table 2 shows test results while changing the composition of coat layer 3 and the curing temperature.

In the tests, test pieces with coat layer 3 in different compositions shown in Examples 1 to 13 of Table 2 were used. In comparative tests, test pieces with coat layer 3 in different compositions prepared at different curing temperatures, shown in Comparative Examples 1 to 5 of Table 2, were used.

Among the test pieces shown in Table 2, PAI was used in Examples 1 to 3 and 6 to 13 and Comparative Examples 1 to 5 and EP in Example 4 and PBI in Example 5 as a base synthetic resin.

In all test pieces excluding that of Comparative Example 1, PTFE was added to the base synthetic resin as a solid lubricant and in Examples 6, 7, 10 and 11 $MoS_2$ was further added thereto, in Examples 8 and 12 and Comparative Example 4 Gr was further added thereto, and in Examples 9 and 13 BN was further added thereto as an additional solid lubricant.

Curing temperature was 350° C. in Examples 1 to 13 and Comparative Examples 1 and 4, 200° C. in Comparative Examples 2 and 3, and 300° C. in Comparative Example 5.

TABLE 1

| | Test procedure | Test conditions |
|---|---|---|
| Coefficient of friction and wear amount | Thrust type test | p = 10 MPa<br>V = 0.5 m/s<br>Time: 4 Hrs<br>Lubrication: oil bath |
| Seizure | Thrust type test | P = 3 MPa accumulation<br>V = 2 m/s<br>Time: at every 30 min.<br>Lubrication: oil dropping |

TABLE 2

| Example No. | Backing alloy | Coat layer composition (vol. %) | | | | | | | Curing temp. (° C.) | Coefficient of friction | Wear amount ($\mu m$) | Seizure load (MPa) |
|---|---|---|---|---|---|---|---|---|---|---|---|---|
| | | PAI | EP | PBI | PTFE | $MoS_2$ | Gr | BN | | | | |
| Ex. 1 | Cu alloy | 95 | | | 5 | | | | 350 | 0.05 | 3 | 21 |
| Ex. 2 | " | 70 | | | 30 | | | | 350 | 0.04 | 5 | 24 |
| Ex. 3 | " | 50 | | | 50 | | | | 350 | 0.03 | 7 | 27 |
| Ex. 4 | " | | 70 | | 30 | | | | 350 | 0.04 | 4 | 24 |
| Ex. 5 | " | | | 70 | 30 | | | | 350 | 0.04 | 1 | 21 |
| Ex. 6 | " | 69 | | | 30 | 1 | | | 350 | 0.03 | 5 | 27 |
| Ex. 7 | " | 35 | | | 5 | 60 | | | 350 | 0.02 | 8 | 21 |
| Ex. 8 | " | 35 | | | 5 | | 60 | | 350 | 0.03 | 9 | 18 |
| Ex. 9 | " | 35 | | | 5 | | | 60 | 350 | 0.03 | 7 | 18 |
| Ex. 10 | Al alloy | 69 | | | 30 | 1 | | | 350 | 0.03 | 6 | 24 |
| Ex. 11 | " | 35 | | | 5 | 60 | | | 350 | 0.03 | 8 | 21 |
| Ex. 12 | " | 35 | | | 5 | | 60 | | 350 | 0.04 | 8 | 18 |
| Ex. 13 | " | 35 | | | 5 | | | 60 | 350 | 0.04 | 7 | 18 |
| Comp. Ex. 1 | Cu alloy | 100 | | | | | | | 350 | 0.09 | 5 | 9 |
| Comp. Ex. 2 | " | 70 | | | 30 | | | | 200 | 0.03 | 12 | 18 |
| Comp. Ex. 3 | " | 50 | | | 50 | | | | 200 | 0.02 | 15 | 18 |
| Comp. Ex. 4 | " | 10 | | | 20 | | 70 | | 350 | 0.03 | 20 or more | 9 |
| Comp. Ex. 5 | Al alloy | 70 | | | 30 | | | | 300 | 0.04 | 13 | 15 |

The following facts can be gathered from the test results of wear amount and coefficient of friction shown in Table 2.

In Examples 1 to 13 showing addition of 5–50% by volume of PTFE and curing temperature of 350° C., the coefficient of friction and the wear amount are as low as 0.02–0.05 and 1–9 μm, respectively, and the seizure load is as high as 18–27 MPa, whereas in Comparative Examples 2, 3 and 5 showing addition of 30 and 50% by volume of PTFE and curing temperatures of 200° C. and 300° C., the coefficient of friction is as low as 0.02–0.04, but the wear amount is as high as 12–15 μm, as compared with Examples 1 to 13, and the seizure load is as low as 15 MPa and 18 MPa. This is because in Examples 1 to 13, a higher curing temperature than the melting point of PTFE is selected, and thus PTFE is released from the coat layer 3 to the surface to form a thin film 4 of PTFE on the surface of coat layer 3, whereas in Comparative Examples 2, 3 and 5 lower curing temperatures than the melting point of PTFE are selected, and thus no PTFE is released from the coat layer 3 to the surface and no thin film 4 of PTFE is formed on the surface of coat layer 3. That is, the thin film 4 of PTFE, when formed on the surface of coat layer 3, can reduce the wear amount and improve the anti-seizure characteristics.

In Examples 6 to 13, further addition of Gr, $MOS_2$ or BN in addition of PTFE can improve the wear resistance and friction property.

In Comparative Examples 1 and 4, the curing temperature is as the same 350° C. as in Examples 1 to 13, but in Comparative Example 1 the coefficient of friction is as high as 0.09 and the seizure load is as low as 9 MPa, because in Comparative Example 1 only PAI is used in the coat layer 3 as a single substance without any addition of a solid lubricant, resulting in poor sliding characteristics. That is, addition of a solid lubricant can reduce the coefficient of friction and improve the anti-seizure characteristics.

In Comparative Example 4, sum total of added solid lubricant is as high as 90% by volume, and thus the hardness of coat layer 3 is lowered, so that the coat layer 3 is easy to wear.

In all Examples 1 to 13, 350° C. is selected as a curing temperature, but even at 327° C. similar good results can be obtained.

In Examples 1 to 13, 5–65% by volume of the solid lubricant is added, but even at 70% by volume, similar good results can be obtained.

It is evident from the foregoing that in the present inventive plain bearing a counter member can slide over the thin film of polytetrafluoroethylene formed on the surface of the coat layer, so that the coefficient of friction can be reduced and the counter member can smoothly slide over the thin film even at the initial stage of sliding. Furthermore, the conformability of the coat layer can be improved thereby, and thus, for example, the counter member, even if in an abutting position, is never worn away. Still furthermore, the anti-seizure characteristics of the coat layer can be improved thereby, so that the plain bearing can be used even in a high load condition.

In the present inventive plain bearing, the wear resistance and friction property of the plain bearing can be improved by limiting the content of the solid lubricant in the coat layer to a specific range and furthermore reduction in the coefficient of friction and improvement of conformability and anti-seizure characteristics of the plain bearing can be attained by forming a thin film of polytetrafluoroethylene on the surface of the coat layer.

Still furthermore, in the present inventive process for producing a plain bearing, a thin film of polytetrafluoroethylene can be formed on the surface of the coat layer, so that a plain bearing with a lower coefficient of friction and improved conformability and anti-seizure characteristics can be produced.

What is claimed is:

1. A plain bearing, which comprises a backing alloy made of copper alloy or aluminum alloy, a coat layer of synthetic resin formed on the surface of the backing alloy, and a thin film of polytetrafluoroethylene formed on the surface of the coat layer.

2. A plain bearing according to claim 1, wherein the synthetic resin comprises 95–30% by volume of a thermosetting resin or polybenzoimidazole, and 5–70% by volume of a solid lubricant, at least 5–50% by volume of the solid lubricant being polytetrafluoroethylene.

3. A process for producing a plain bearing in accordance with claim 1, which comprises roughening a synthetic resin-to-be-coated surface of a backing alloy, cleaning and activating the roughened synthetic resin-to-be-coated surface, coating the roughened synthetic resin-to-be-coated surface with a synthetic resin, and curing the coated synthetic resin at a temperature of not lower than the melting point of polytetrafluoroethylene, thereby forming a coat layer.

4. A process according to claim 3, wherein the synthetic resin comprises 95–30% by volume of a thermosetting resin or polybenzoimidazole and 5–70% by volume of a solid lubricant, at least 5–50% by volume of the solid lubricant being polytetrafluoroethylene.

* * * * *